US005647244A

United States Patent [19]

Girotto et al.

[11] Patent Number: 5,647,244

[45] Date of Patent: Jul. 15, 1997

[54] ELECTROMAGNETIC ACTUATOR FOR DOOR UNITS AND THE LIKE

[75] Inventors: Giuseppe Girotto, Fagaré ; Giovanni Serafin, Treviso, both of Italy

[73] Assignee: Peitro Girotto, Italy

[21] Appl. No.: 464,818

[22] PCT Filed: Dec. 6, 1993

[86] PCT No.: PCT/EP93/03423

§ 371 Date: Jun. 29, 1995

§ 102(e) Date: Jun. 29, 1995

[87] PCT Pub. No.: WO94/13917

PCT Pub. Date: Jun. 23, 1994

[30] Foreign Application Priority Data

Dec. 10, 1992 [IT] Italy .................................. TS92A0018
Sep. 1, 1993 [IT] Italy .................................. TS93A0005

[51] Int. Cl.⁶ ................................................ F16H 27/02

[52] U.S. Cl. ........................... 74/89.17; 74/89.14; 49/199

[58] Field of Search ................................ 74/89.14, 89.17, 74/424.6; 49/199

[56] References Cited

U.S. PATENT DOCUMENTS 3,163,054 12/1964 Werner .................................... 74/424.6
3,392,488 7/1968 Werner .
4,311,225 1/1982 Tsubaki et al. .
4,520,684 6/1985 Meyer et al. .
5,044,222 9/1991 Tanaka et al. .
5,221,869 6/1993 Williams et al. .......................... 49/199
5,222,403 6/1993 Angelini et al. ........................... 49/199

FOREIGN PATENT DOCUMENTS 2618110 11/1977 Germany .
3501454 9/1986 Germany .

*Primary Examiner*—Charles A. Marmor
*Assistant Examiner*—David M. Fenstermacher
*Attorney, Agent, or Firm*—Hoffman, Wasson & Gitler

[57] ABSTRACT

An electromagnetic actuator for door units and the like, particularly for up-and-over doors, which includes a tubular guide having at least two side-by-side rectilinear portions, a flexible rack housed partly within one rectilinear portion of the guide and partly within the other, such that it can undergo axial sliding, a geared motor unit provided with a gearwheel engaging the flexible rack via an aperture, provided in at least one of the two rectilinear portions of the tubular guide, one hanger fixed to the flexible rack, and members for mechanically connecting the hanger appendix to the door unit or the like to be moved.

13 Claims, 4 Drawing Sheets

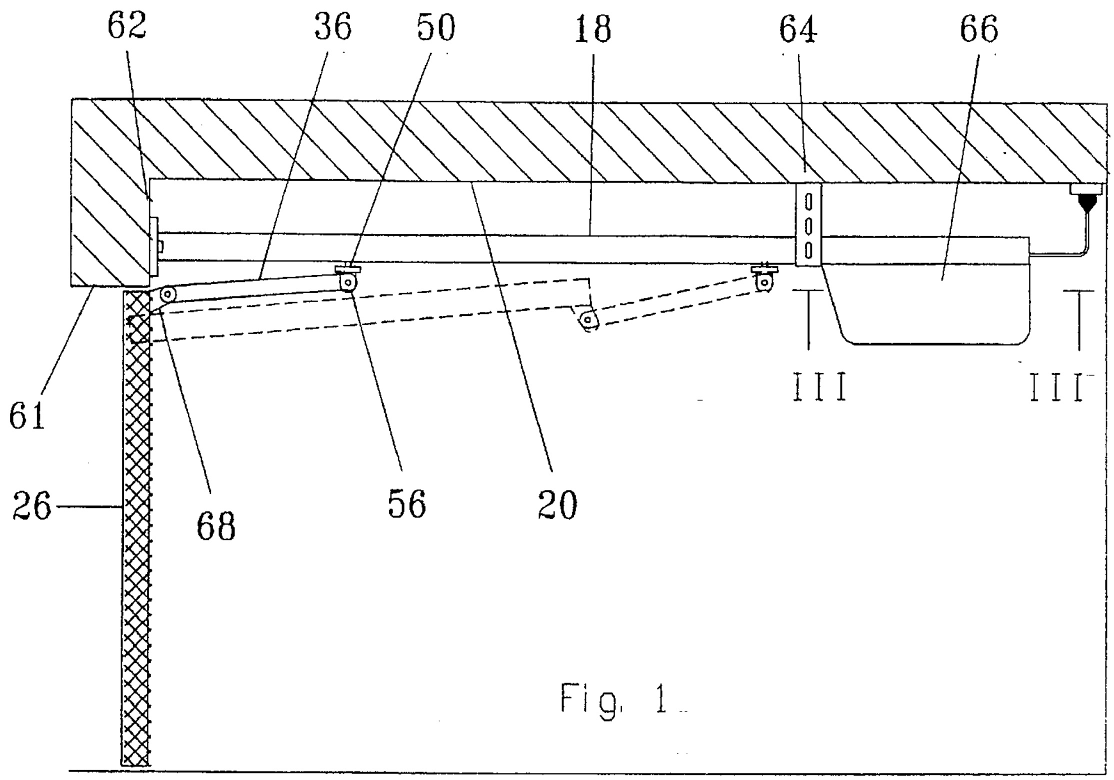
Fig. 1
Fig. 7
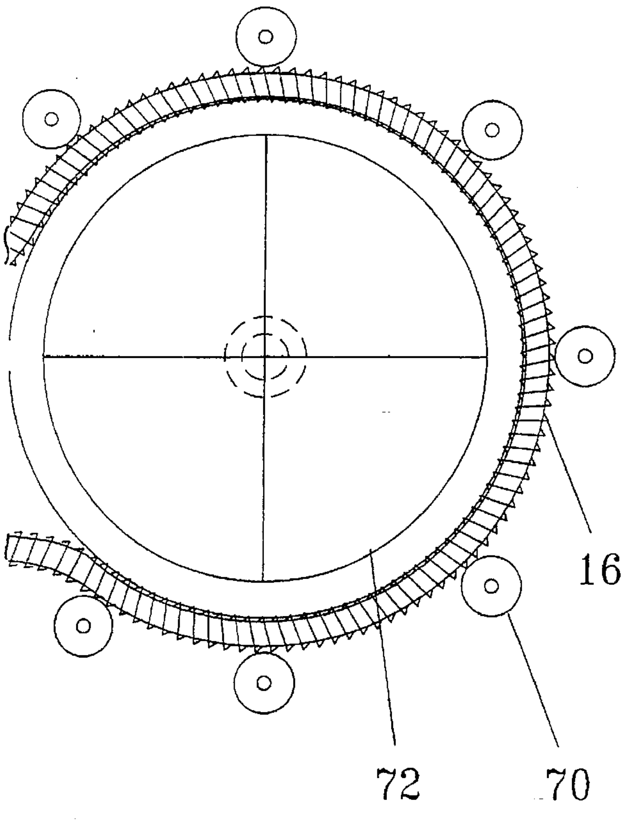

ELECTROMAGNETIC ACTUATOR FOR DOOR UNITS AND THE LIKE

FIELD OF THE INVENTION

This invention relates to an electromagnetic actuator for door units and the like, particularly for up-and-over doors.

BACKGROUND OF THE INVENTION

Devices for opening and closing up-and-over doors are known. One of these comprises a geared motor fitted to the up-and-over door and provided with a transversely extending exit shaft connected by articulated vertical arms to couplings rigid with the uprights of the door frame. Rotation of the geared motor causes the articulated arms to rotate about the corresponding frame couplings, with consequent opening and closure of the up-and-over door.

A drawback of this known device is its difficulty of installation, which requires several operations on the up-and-over door for fitting it with external members such as the supports for the geared motor, the support bushes for the transverse shaft, the articulated arms and the relative couplings on the door frame.

A further drawback is that these members increase the weight of the entire door and therefore require adjustment of the counter-weights or the compensation springs to counterbalance said weight.

A further drawback is that the transverse shaft does not allow a usual inwardly opening small service to be applied to the up-and over door.

A further drawback is that up-and-over doors of different width require transverse shafts of corresponding length, with the evident impossibility of constructing standardized operating devices applicable to any up-and-over door.

To obviate these drawbacks an up-and-over door operating device has been proposed comprising a rail to be fixed to the room ceiling to the up-and-over door and able to guide a trolley connected to the door upper cross-member by an articulated bar. The trolley is driven by a belt or chain extending between two sprockets, one of which is driven, so that rotating the motor in one or the other direction causes the trolley to travel along its guide and hence open and close the up-and-over door.

The drawback of this arrangement is a certain constructional complexity due to the large number of components (articulated bar, trolley, trolley guide, chain, chain tensioner, geared motor) and hence the high cost of the device plus the considerable labor involved in its installation.

A further drawback is that the large number of moving parts, each of which is potentially subject to breakdowns, means that its operation is not particularly reliable.

As an alternative to the endless chain it has also been proposed to move the trolley along the guide by a threaded rod driven by a geared motor and engaging a threaded bush rigid with the trolley. In this manner the number of components and hence the installation complexity are reduced while at the same time increasing their reliability of operation, even if in practice the cost of the device plus its installation is not substantially different.

DISCUSSION OF THE PRIOR ART

DE-A-3501454 discloses an electromagnetic actuator for door units and the like comprising a tubular guide comprising two parallel side-by-side rectilinear portions, a flexible rack housed partly within one rectilinear portion of the tubular guide and partly within the other such that it can undergo axial sliding, a geared motor unit provided with a gearwheel engaging the flexible rack via an aperture provided in one of the two rectilinear portions of the tubular guide, one hanger fixed to said flexible rack, and members for mechanically connecting the hanger appendix to the door unit or the like.

SUMMARY OF THE INVENTION

An object of the invention is to provide a device of the above type which is of low cost, easy and quick installation, reliable operation and universal use.

This and further objects which will be apparent from the following description are attained according to the invention by an electromagnetic actuator for door units and the like, particularly for up-and-over doors, comprising:

a tubular guide comprising at least two parallel side-by-side rectilinear portions, a flexible rack housed partly within one rectilinear portion of the guide and partly within the other such that it can undergo axial sliding, a geared motor unit provided with a gearwheel engaging the flexible rack via an aperture provided in at least one of the two rectilinear portions of the tubular guide, at least one hanger fixed to said flexible rack, and members for mechanically connecting the hanger appendix to the door unit or the like to moved, wherein:

the flexible rack consists of a metal wire spirally wound about a flexible core, the hanger is emerging via an appendix through a continuous longitudinal slot provided in at least one of the two rectilinear portions, the gearwheel of the geared motor unit simultaneously engages two points of the flexible rack within the two rectilinear tubular guide portions.

BRIEF DESCRIPTION OF THE DRAWINGS

Some preferred embodiments of the present invention are described in detail hereinafter with reference to the accompanying drawings, in which:

FIG. 1 is a schematic side view of an electromagnetic actuator according to the invention applied to an up-and-over door;

FIG. 7 shows a further partial embodiment thereof in the same view as FIG. 3;

DESCRIPTION OF THE PREFERRED EMBODIMENTS

Figure 2:
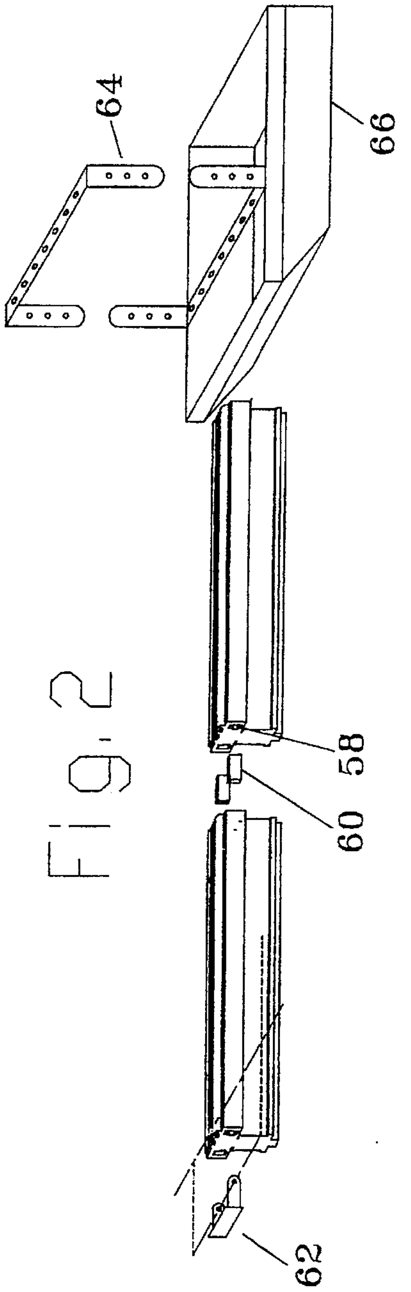
FIG. 2 is an exploded perspective view thereof.
Figure 4:
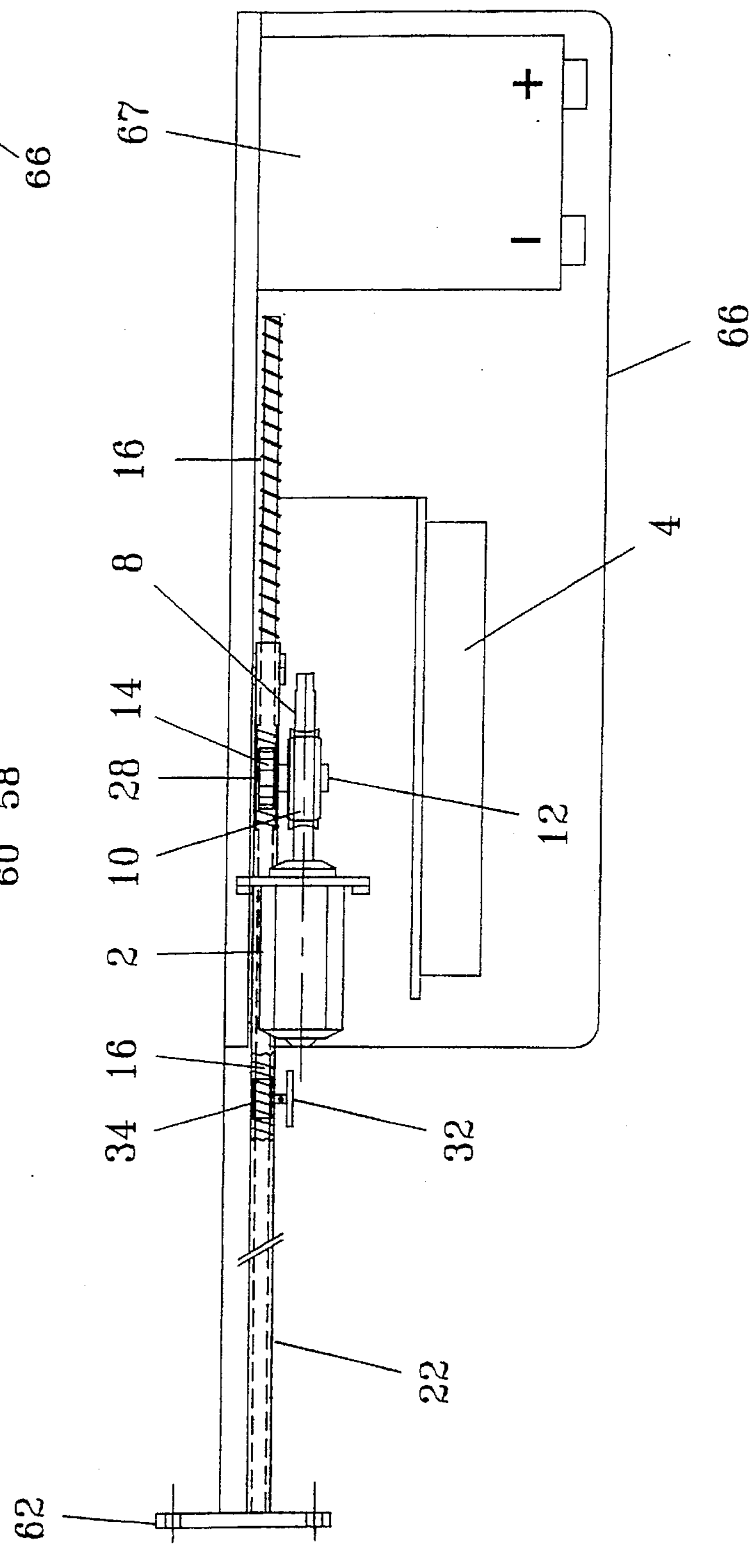
FIG. 4 is a cross-section therethrough on the line IV—IV of FIG. 3.

As can be seen from the figures, the electromagnetic actuator according to the invention comprises an electric motor 2, preferably powered by direct current via a control unit 4 and having a worm 6 keyed onto its exit shaft 8. The worm 6 engages a helical ring gear 10, on the shaft 12 of which there is keyed a gearwheel 14 engaging a flexible rack 16, consisting of a steel wire spirally wound at constant pitch about a flexible core in the form of a metal cord.

The flexible rack 16 is housed within a tubular guide 18 fixed to the Ceiling 20 and comprising two rectilinear portions 22, 24 positioned perpendicular to the upper cross-member of the up-and-over door 26. Each rectilinear portions 22, 24 comprises a lateral aperture 28, through which the gearwheel 19 engages the flexible rack 16. The portion 22 also comprises a continuous longitudinal slot 30 along which there can slide the projecting arm 32 of a hanger 34 which is fixed to one end of the flexible rack 16 and is connected to the central part of the upper cross-member of the up-and-over door 26 by an articulated arm 36.

Figure 5:
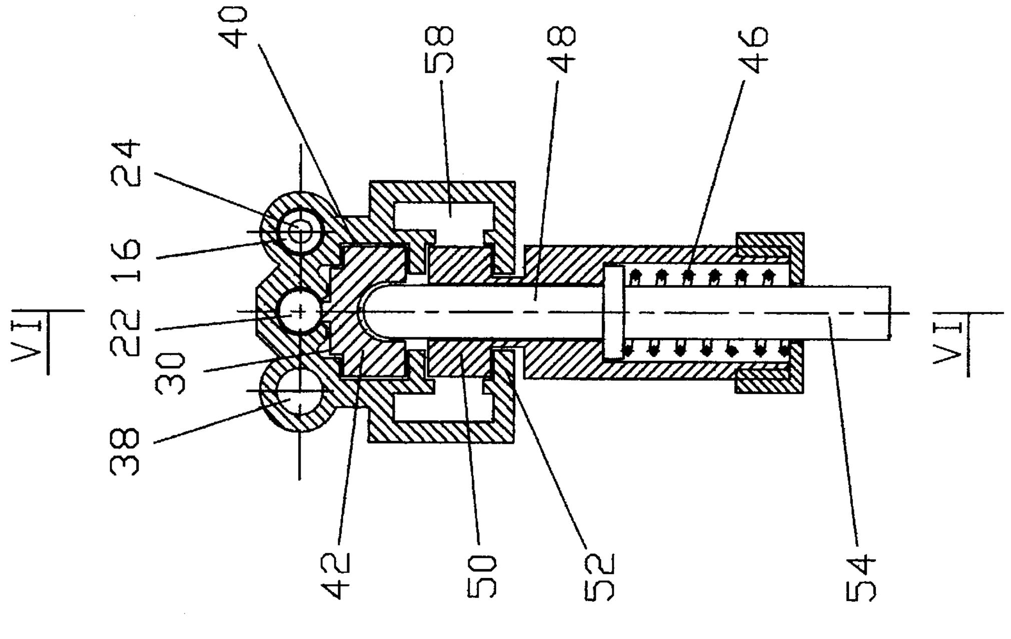
FIG. 5 is a longitudinal section therethrough on the line V—V of FIG. 3.

The two rectilinear portions 22,24 of the tubular guide 18, advantageously consist of two parallel longitudinal cavities of a single section bar formed for example of extruded aluminium, as is apparent from FIG. 5. Specifically, this extruded section bar comprises a central longitudinal cavity, forming the tubular guide portion 22, and two cavities flanking the sides of this latter, one of which forms the other rectilinear portion 24 and the third 38 forms a service cavity for the passage of electric cables. In a position below the three cavities 22, 24 and 38 there is provided a further cavity 50 for guiding a slide 42 rigid with the hanger 34 fixed to the flexible rack 16. The slide 42, the cross-section of which is overall complementary to the cross-section of the cavity 40, in reality comprises a block with two inclined surfaces, between which there is a seat 44 in which there snap-engages elastically, by the effect of a spring 46, a pin 48 provided in a second slide 50 slidable along a longitudinal cavity 52 formed in the same section bar in a position below the longitudinal cavity 40. The pin 48, which as stated is elastically maintained in engagement with the seat 44 provided in the slide 42 by means of a spring 46, can be operated from the outside by means of its appendix 54, which is provided with a hooking ring. The slide 50 is provided with a lug 56 for connecting that end of the articulated bar 36 not fixed to the up-and-over door 26.

As this embodiment of the actuator according to the invention makes continuity of the tubular guide 18 essential, the two rectilinear portions 22, 24 must be connected together at the end distant from the up-and-over door 26 by a rigid tubular connection element within which the flexible rack 16 can slide and be guided.

For installing the actuator according to the invention the procedure is as follows: if the tubular guide 18 is in the form of pieces of section bar, these pieces are firstly joined together to facilitate packaging and transport. This is easily accomplished because each piece is provided with two longitudinal cavities 58 into which blocks or plugs 60 can be inserted, to then be fixed by screws to the two pieces of section bar to be connected together.

A bracket 62 for securing the front end of the tubular guide 18 is then fixed to the lintel 61 upperly bounding the space within which the up-and-over door is applied, and a further bracket 64 for holding the box 66 housing the geared motor unit 2,6,8,10 the control unit 4 and a possible emergency electrical battery 67 is fixed to the ceiling.

The actuator according to the invention, comprising the tubular guide 18 and equipped with the box 66, is then fixed to the two brackets 62 and 64, and the articulated bar 36 is fixed at one end to a bracket 68 previously fixed to the up-and-over door 26 and at its other end to the lug 56 on the slide 50. If during installation it is found that the tubular guide 18 is too long, it can be shortened to the required length very easily by simply cutting off a piece of the section bar and a corresponding piece of the flexible rack 16.

During operation the rotation of the electric motor 2 causes the gearwheel 14 to rotate, resulting in axial sliding of the flexible rack 16 along the tubular guide from one rectilinear portion 22,24 to the other. As the slide 42 is applied via the hanger 34 to the flexible rack 16 and this slide is fixed to the slide 50 which is connected to the up-and-over door 26, it is apparent that rotating the electric motor 2 in one or the other direction causes the up-and-over door 26 to open and close. Traditional travel limiting systems, consisting for example of microswitches applied to the tubular guide 18 or forming part of the operational logic of the control unit 4, enable the electric motor to be operated only between the open and closed positions of the up-and-over door. If the electric power should fail, it is necessary merely to pull on the pin 48 in order to release the slide 50 from the slide 42 fixed to the flexible rack, and then manually move said slide 50 along the corresponding guide 52. To again mutually engage the two slides 50 and 42 it is sufficient to move the slide 50 towards the slide 42 until, after sliding along one of its inclined surfaces, the pin 48 snap-engages securely in the seat 44 provided between them.

It is apparent from the aforegoing that the electromagnetic actuator according to the invention is advantageous composed of and can be equipped with a very small number of part, in order to be of very low cost, quick to be installed and is of reliable operation.

With regard to the small number of parts, these consist substantially of a plate on which the control unit 4, the geared motor unit 2,6,8,10 and possibly the electric battery 67 for emergency operation are mounted, the tubular guide 18 and the bar 36 for connection to the up-and-over door 26. The small number of parts obviously results in a device of low cost and of considerable operational reliability.

With regard to quick installation, it is sufficient firstly to assemble the actuator on the ground in the already described form, then fix the bracket 62 to the lintel 61, then fix the end of the device guide 18 to said bracket 62, and then fix the device to the ceiling 20 by the bracket 64. Finally, after applying the bracket 68 to the up-and-over door 26 the articulated bar 36 is mounted between said bracked 68 and the slide 50 of the actuator. This is all achieved by simple operations which can be effected independently of each other, without risk of error and with the certainty of being able to adapt the device to up-and-over doors practically of any size.

Figure 3:
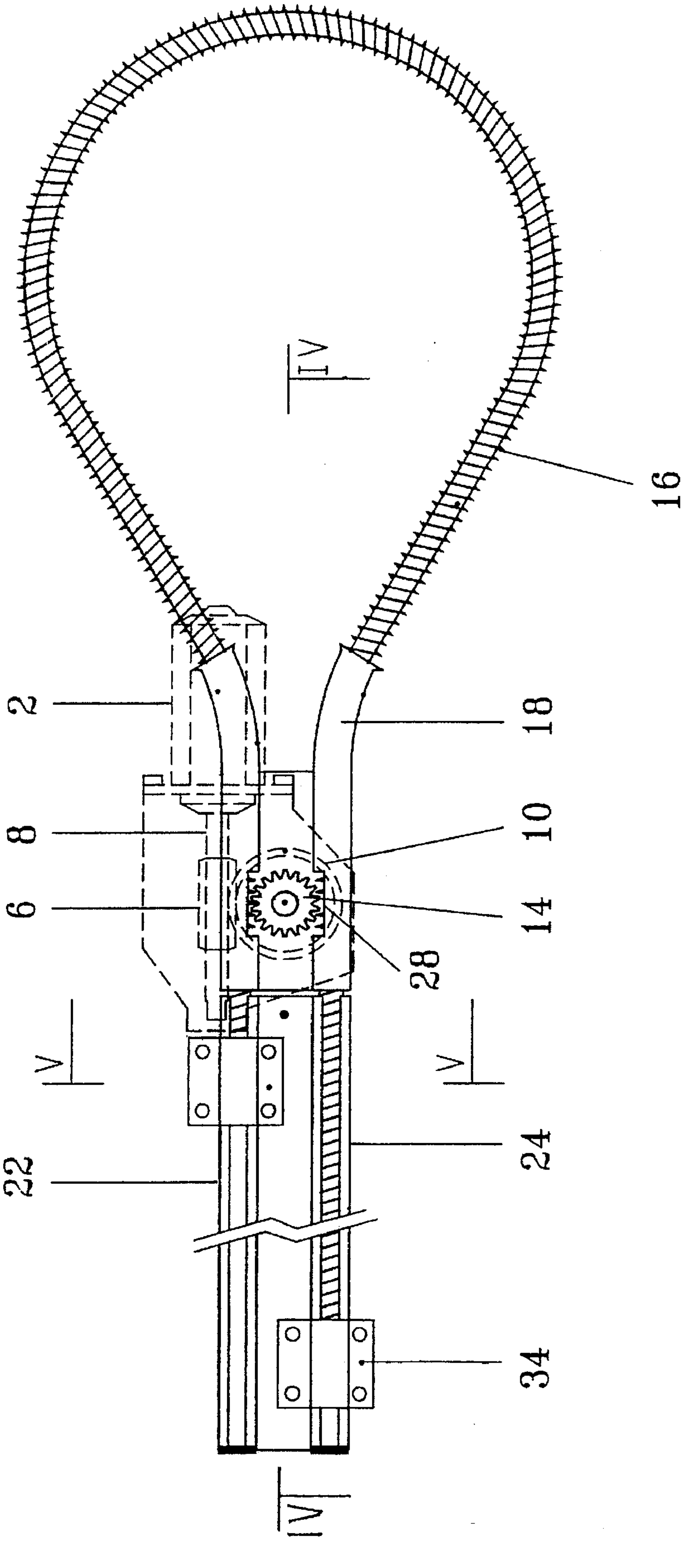
FIG. 3 is an enlarged horizontal view thereof on the line. III—III of FIG. 1.
Figure 6:
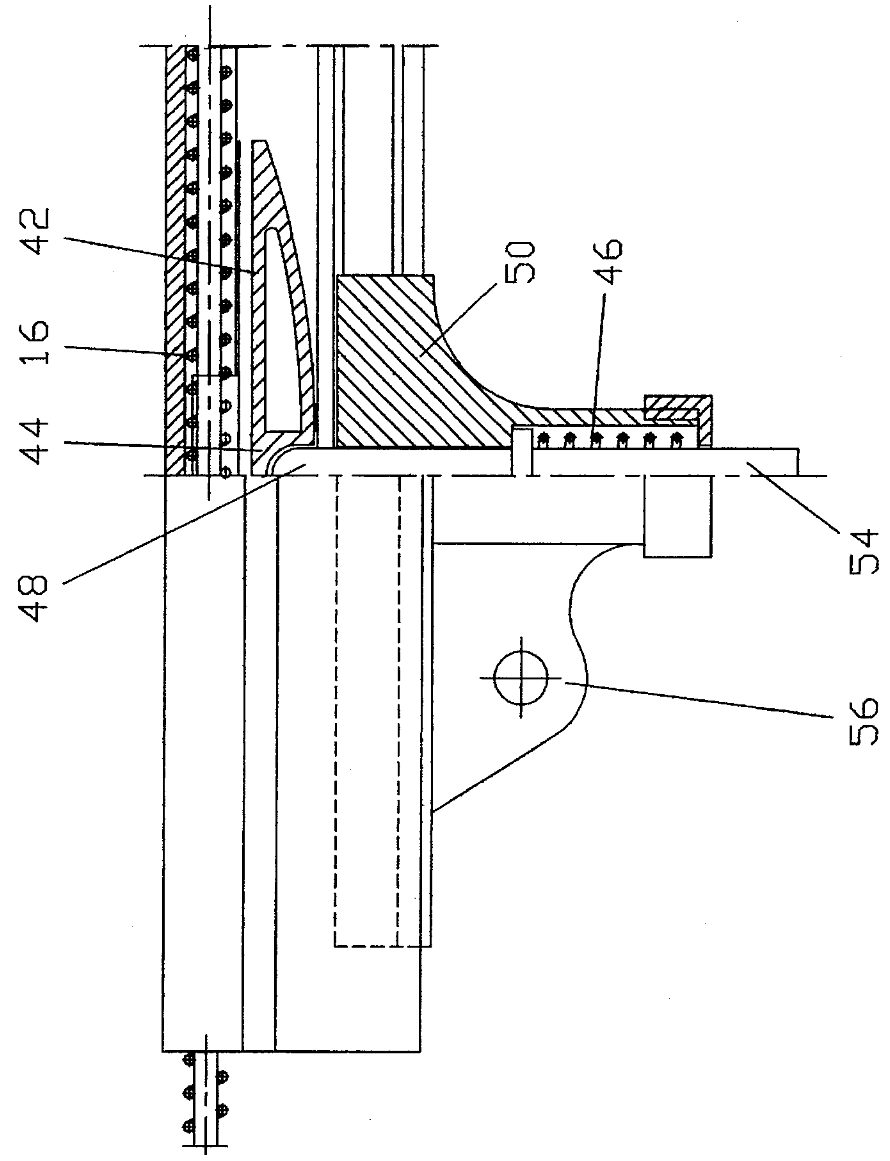
FIG. 6 is a longitudinal section therethrough on the line VI—VI of FIG. 5.

According to the invention the flexible rack 18 is engaged by the gearwheel 14 in both the rectilinear portions 22, 24 of the tubular guide 18, which allows as an embodiment of the invention the loop formed by the flexible rack 18 to be unguided (see FIG. 3).

In this case not only is friction practically eliminated along the loop of the flexible rack, but in addition the actuator construction is considerably more simple.

In addition, from the operational viewpont this embodiment is particularly advantageous for operating with identical force two elements slidable in opposite directions.

This makes the actuator of the invention suitable for use in operating oppositely sliding doors, curtains or the like. In this case both the rectilinear portions 22,24 of the tubular guide 18 must be provided with a continuous longitudinal slot, and a hanger 34 must be fixed to the flexible rack 16 at each of said rectilinear portions 22,24. If these two rectilinear portions form part of single section bar, the section bar should be provided with separate longitudinal cavities 40 for two separate slides connected to the two hangers.

It is also possible (see FIG. 7) that the portion of the tubular guide 18 connecting the two rectilinear portions 22, 24 together is replaced by a plurality of idle rollers 70 arranged to cooperate with an idle guide pulley 72 so that the flexible rack 18 forms the loop connecting together the parts slidable within said rectilinear portions 22, 24.

Although this embodiment requires the rollers and guide pulley, it eliminates the need for a continuous tubular guide between the two straight portions 22 and 24, and hence simplifies the formation of said tubular guide 18 while at the same time reducing friction, which is inevitably present along the loop formed by said flexible rack.

What is claimed is:

1. An electromechanical actuator for door units comprising:

a tubular guide comprising at least two parallel side-by-side rectilinear portions, a flexible rack including a metal wire spirally wound about a flexible core and two rectilinear parts housed within said at least two rectilinear portions of said tubular guide and a connecting loop disposed therebetween, free from said tubular guide, a geared motor unit actuating a gearwheel having its axis orthogonal to a plane defined by said rectilinear portions of said tubular guide, said gearwheel being placed between said rectilinear portions and simultaneously engaging, through corresponding apertures in said rectilinear portions, both said parts of said flexible rack, at least one hanger fixed to said flexible rack and emerging via an appendix through a continuous longitudinal slot provided in at least one of said two rectilinear portions of said tubular guide, and members for mechanically connecting said appendix to an element to be moved.

2. An actuator as claimed in claim 1, wherein said tubular guide comprises a curved portion connecting together said at least two rectilinear portions.

3. An actuator as claimed in claim 1, wherein said tubular guide is formed from a section bar comprising two longitudinal chambers which make up said at least two rectilinear portions.

4. An actuator as claimed in claim 3, wherein said tubular guide is formed from several section bar portions maintained in a mutually aligned state by blocks fixed simultaneously to two adjacent section bar portions.

5. An actuator as claimed in claim 4, wherein said fixing blocks for adjacent section bars are pegs inserted simultaneously into longitudinal cavities in said section bars.

6. An actuator as claimed in claim 3, wherein said section bar forming said tubular guide is provided with at least a third cavity to pass cables.

7. An actuator as claimed in claim 1, wherein said geared motor unit comprises an electric motor, on an exit shaft of which there is keyed a worm engaging a helical ring gear rotationally rigid said gearwheel engaging said flexible rack.

8. An actuator as claimed in claim 3, wherein said section bar forming said tubular guide is provided with a longitudinal cavity for a slide, rigid with said hanger fixed to said flexible rack.

9. An actuator as claimed in claim 8, wherein said section bar forming said tubular guide is provided with a second longitudinal cavity for a second slide removably connected to said first slide slidable within said longitudinal cavity, wherein members for mechanically connecting said hanger appendix to said element to be moved being fixable to said second slide.

10. An actuator as claimed in claim 9, wherein said first slide is provided with a seat for releasable snap-engagement by an appendix rigid with said second slide.

11. An actuator as claimed in claim 10, wherein said seat provided in said first slide is bounded by inclined surfaces.

12. An actuator as claimed in claim 1, wherein a portion of said flexible rack not housed within said at least two rectilinear portions of said tubular guide forms a free loop.

13. An actuator as claimed in claim 1, wherein to each of said two portions of said flexible rack housed within said at least two rectilinear portions of tubular guide there is fixed a hanger for securing said element to be moved.

* * * * *